(12) United States Patent
Torno et al.

(10) Patent No.: US 6,662,781 B1
(45) Date of Patent: Dec. 16, 2003

(54) METHOD AND DEVICE FOR ELECTRONIC SPARK CONTROL IN THE EVENT OF THE FAILURE OF THE PHASE DETECTOR

(75) Inventors: Oskar Torno, Schwieberdingen (DE); Axel Heinstein, Wimsheim (DE); Carsten Kluth, Stuttgart (DE); Werner Haeming, Neudenau (DE); Michael Baeuerle, Ditzingen (DE); Steffen Franke, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,581

(22) PCT Filed: Apr. 27, 2000

(86) PCT No.: PCT/DE00/01323

§ 371 (c)(1),
(2), (4) Date: Mar. 15, 2002

(87) PCT Pub. No.: WO00/66888

PCT Pub. Date: Nov. 9, 2000

(30) Foreign Application Priority Data

May 3, 1999  (DE) ......................................... 199 20 016

(51) Int. Cl.$^7$ ............................. F02P 5/152; F02P 15/08
(52) U.S. Cl. ............................ 123/406.16; 123/406.18; 123/406.21
(58) Field of Search ...................... 123/406.16, 406.18, 123/406.21, 406.29; 73/35.04

(56) References Cited

U.S. PATENT DOCUMENTS

| 5,572,973 A | 11/1996 | Schenk ................... 123/406.18 |
| 2002/0073766 A1 * | 6/2002 | Sauler et al. ............... 73/35.04 |

FOREIGN PATENT DOCUMENTS

| DE | 41 25 677 | 2/1993 |
| DE | 42 29 773 | 3/1994 |
| EP | 0 375 635 | 6/1990 |
| JP | 59 215 964 | 12/1984 |
| WO | WO 91 14097 | 9/1991 |

* cited by examiner

*Primary Examiner*—Tony M. Argenbright
(74) *Attorney, Agent, or Firm*—Kenyon & Kenyon

(57) ABSTRACT

A method and a device for controlling knock in response to the failure of a phase detector are described, which implement the normal, cylinder-selective knock control under the condition, that the dual ignition is not activated. If the dual ignition is activated when the phase detector fails, then the knock control is carried out, using a non-cylinder-selective measure. Such a non-cylinder-selective measure could include safety-ignition retard or knock control, using one knock-detection threshold value for all of the cylinders.

10 Claims, 2 Drawing Sheets

METHOD AND DEVICE FOR ELECTRONIC SPARK CONTROL IN THE EVENT OF THE FAILURE OF THE PHASE DETECTOR

FIELD OF THE INVENTION

The present invention relates to a method and a device for controlling the knock of an internal combustion engine.

BACKGROUND INFORMATION

In an internal combustion engine, the spontaneous ignition of the fresh mixture not yet reached by the flame front can result in the occurrence of abnormal combustion processes, which are referred to as engine knock. Due to the increased thermal stress and the pressure waves that occur, persistent engine knock can result in damage to the component parts of the combustion chamber.

The ignition firing point is an important parameter that influences the tendency of the internal combustion engine to experience knocking. Combustion knock occurs when the fuel-air mixture in the combustion chamber is ignited too soon. Therefore, a possible measure for eliminating engine knock after its detection, in subsequent combustion, is to retard the ignition firing point.

Overretarded ignition is associated with a loss of efficiency. Therefore, a knock control system, which initially determines if combustion knock has occurred, is used in internal combustion engines. This part of the knock control is known as knock detection. Secondly, the ignition-advance angle is adjusted during the knock control. An example of such knock control is known from the International Publication No. WO 91/14097. However, other regulated quantities, such as the fuel-air mixture, the charge, the compression ratio, and the operating point of the engine, can be changed in order to reduce the knock sensitivity of an engine.

It is also known, that the engine knock can be controlled in a cylinder-selective manner, i.e. both the knock detection and the adjustment of the ignition-advance angle are carried out separtely for each cylinder. Constructional differences in the cylinders and non-uniform distribution of the knock sensors and the accompanying cylinder-selective knock signals result in cylinder-specific differences in the knock control, so that a cylinder-selective knock control reduces the knock sensitivity, while simultaneously optimizing the efficiency.

If the phase detector, which supplies the signals forming the basis of the ignition synchronization and the knock-control synchronization, malfunctions, then the cylinder-selective knock control implemented up to this point is subject to new requirements. In this case, the knock control should function in a highly reliable manner because of possible damage to the engine, and should function with high accuracy to attain a maximum efficiency.

SUMMARY OF THE INVENTION

The method and device according to the present invention have the advantage, that the knock control can be designed to be variable, depending on the activation of dual ignition. Non-cylinder-specific measures influencing the knock control are carried outas an emergency strategy. Since this can change during the running time of the engine, or after restarting it, it is also advantageous that the method and device of the present invention adapt to the specific operating state of the engine. Thus, a maximum efficiency can be realized for the combustion, and a high degree of reliability can be attained for the knock control. For example, the method of the present invention allows the knock control to be optimized in spite of the phase detector malfunctioning, when the sychronization could be restored by another measure.

Further advantages resulting from the exemplary embodiments of the present invention relate to the special, non-cylinder-specific measures implemented there. These advantages offer a high degree of reliability in eliminating occurrances of knock, owing to the selection of the knock-detection threshold value or the selection of the ignition-advance angle.

The present invention can be further improved by integrating the method and device of the present invention, which include the various, non-cylinder-selective measures, into a universal control unit that selects a special, non-cylinder-selective measure as a function of the type of engine and the operating state. This multifunction control unit can be used for various types of engines; in each case, the multifunction control unit selecting the most suitable, non-cylinder-specific measure.

DETAILED DESCRIPTION

Figure 1:
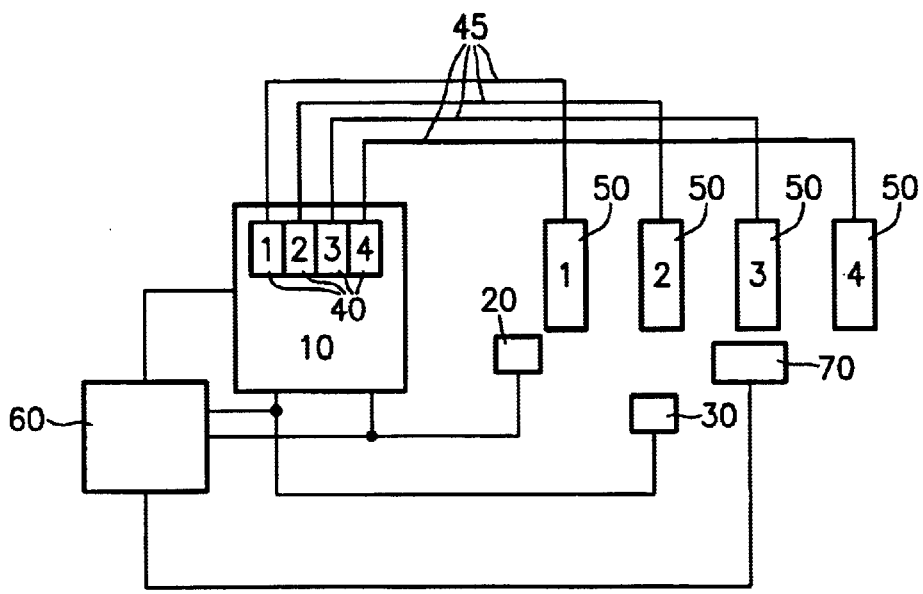
FIG. 1 shows a schematic of a 4-cylinder engine having an ignition control unit and a knock control system.

An internal combustion engine having 4 cylinders is represented in FIG. 1. An engine having more or less than 4 cylinders is set up analogously to FIG. 1. The internal combustion engine in FIG. 1 includes an ignition control unit 10, which is connected to a speed sensor 20 and a phase detector 30. Ignition control unit 10 controls the ignition coils 40 assigned to each cylinder 1 through 4. Ignition control unit 10 and, therefore, ignition coils 40 are connected to spark plugs 50 denoted by 1 through 4, via ignition control lines 45, each ignition coil 40 being connected to a correspondingly numbered spark plug. In other words, spark plug 1 is assigned to cylinder 1, spark plug 2 is assigned to cylinder 2, spark plug 3 is assigned to cylinder 3, and spark plug 4 is assigned to cylinder 4. A knock control device 60, which is connected to ignition control unit 10 and to one or more knock sensors 70, also belongs to the engine. It is possible to combine ignition control unit 10 and knock control device 60 into an engine/multifunction control unit. In addition, the knock control arrangement is also connected to speed sensor 20 and phase detector 30. The knock control arrangement supplies an angle signal to the ignition, in order to prevent engine knock and simultaneously allow the engine to operate near the knock point.

Phase detector 20 measures the rotational speed of the crank shaft. In addition, the presence of a marking allows one to use the speed sensor to determine when the crank shaft has completed a rotation. Phase detector 30 detects when the camshaft has completed a rotation. The crank shaft rotates two times, i.e. 720 degrees, during the course of a four-stroke cycle. In this context, it is not possible to determine whether the crank shaft is in the angular range of 0 to 360 degrees, or in the angular range of 360 to 720 degrees; in other words, the stroke of the four-stroke engine cycle, in which a cylinder finds itself at that instant, cannot be determined. In the same period of time, the camshaft rotates one time, or 360 degrees. Therefore, the signal of phase detector 30 can be used to determine the phase of the four-stroke cycle, in which each cylinder finds itself.

Figure 2:
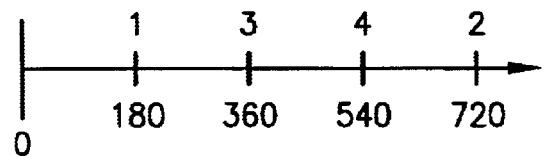
FIG. 2 shows a timeline illustrating the ignition firing points of a 4-cylinder engine.

The ignition sequence of the cylinders, along with the corresponding crank angles in degrees, are illustrated in FIG. 2, for a four-cylinder engine, using a timeline. Specific times are indicated by vertical marks in the timeline.

The crank shaft position corresponding to these times is given underneath the timeline, in degrees. The cylinder in the top-dead-center combustion position at the particular time is given above the timeline. From now on, top dead center shall be referred to as OT. Since the four-stroke process extends over two rotations of the crank shaft, the piston is at TDC, the reversal point of the piston, two times, the first time being at the start of the intake stroke. This TDC is referred to as overlap-TDC. The second time, in which the piston is at TDC, is at the start of the power stroke. This TDC is called combustion-TDC. The mixture in the combustion chamber is only ignited at combustion-TDC, and is burned during the power stroke.

In each case, the signal of speed sensor 20 alone just allows one to determine which so-called cylinder groups are at TDC. In the case of a 4-cylinder engine, cylinders 1 and 4 or cylinders 2 and 3 can be at TDC simultaneously. The signal of the speed sensor alone does not allow one to determine which cylinder of the cylinder groups is at combustion-TDC.

However, the signals of a phase detector and a speed sensor are also significant for controlling engine knock. The noises of the combustion processes in the cylinders are detected by knock sensor or knock sensors 70, which send corresponding electrical signals to knock control device 60. In this context, the noises are detected inside a certain time window subsequent to ignition, the so-called measuring window, in which engine knock typically occurs. Using the stroke coming from speed sensor 20 and phase detector 30, the measuring window can be correctly set in time, and the electrical signals can be assigned to a cylinder of the engine. Knock control device 60 includes a storage medium, which stores a threshold value for each cylinder. If the ratio of the integrated noise signal of the specific combustion process assigned to a cylinder, to the background noise signal, exceeds this so-called knock-detection threshold value of the corresponding cylinder, then knock control device 60 recognizes that knock has occurred during the combustion in this cylinder. In this context, the background noise signal results from an average value of the integrated noise signals taken from a certain number, e.g. 16, of the previously occurring combustion processes. When engine knock is detected, knock control device 60 outputs measures to ignition control device 10, in order to eliminate knock in subsequent combustion processes. These measures are particularly cylinder-selective. For example, the ignition is only retarded for the cylinder that just experienced knock.

When phase detector 30 malfunctions for reasons not given, the ignition control device 10 can then no longer recognize which cylinder is currently at combustion-TDC. Therefore, there is a danger of the engine failing. A possible measure, which can be carried out by the control unit to prevent the engine from failing, is dual ignition, i.e. ignition is provided at each TDC of each cylinder. This ensures that ignition is always provided at combustion-TDC. However, dual ignition can also be activated for reasons other than the malfunction of the phase detector.

Figure 3:
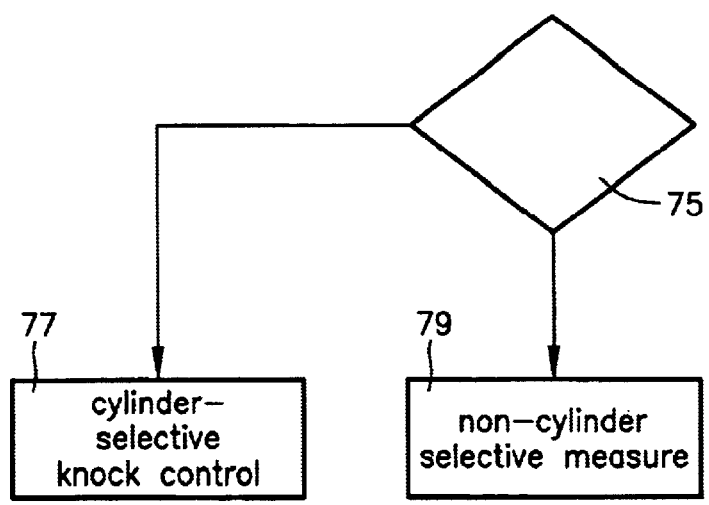
FIG. 3 shows a flowchart explaining the procedure of the present invention, when the phase detector fails.

The functionality of ignition control unit 10 can include measures, which allow it to recognize which OT belongs to the power stroke, even without the signal of phase detector 30. A first exemplary embodiment of the method according to the present invention is represented by a flowchart in FIG. 3. In this case, it is assumed that phase detector 30 has failed. If the question 75 of whether dual ignition was activated is answered with no, then the method carries out cylinder-selective knock control 77. At this point, either the synchronization is coincidentally correct, i.e. the engine happens to be running correctly, or synchronization was achieved by another measure, despite the failure of the phase detector.

If question 75 is answered with yes, that is, if there is dual ignition, then a non-cylinder-selective measure 79 is activated, which influences the further knock control. In this case, the knock control system is not able to identify a noise signal as the knock of a specific cylinder and/or is not able to implement the knock control in a cylinder-selective manner. In response to the failure of phase detector 30 and activation of dual ignition, a measure is therefore be taken, which is not cylinder-selective.

In this context, a knock detection threshold, which is uniform for all cylinders, can be specified as an example of a non-cylinder-selective measure. Because of the engine damage caused by knock, a threshold value is selected, which reliably detects knock. In so doing, it is taken into consideration that too many instances of combustion knock are detected, which results in the individual cylinders being operated far away from the knock limit.

As another measure, all of the cylinders can be assigned the same, permanently preset ignition-advance angle, in which no engine knock occurs. This measure is called safety-ignition retard. Such a fixed ignition-advance angle can either be a fixed angle that is independent of engine parameters such as load, torque requirement, and temperature, or a fixed angle that is a function of engine parameters. The fixed angle can be made up of a permanent value and a differential value, the so-called differential ignition-advance angle. Ignition-advance angles and differential ignition-advance angles can be dependent on or independent of engine parameters. In this case, the non-cylinder-selective measure is the permanent input of this differential ignition-advance angle for all cylinders. Such fixed ignition-advance angles or differential ignition-advance angles are set prior to starting up the engine, and are contained in the memory of ignition control unit 10. This measure results in all of the cylinders operating far away from the knock limit.

If, however, dual ignition is not activated, the cylinder-selective knock control, which is the usual method during normal operation of the engine, is carried out in the method according to the present invention.

Figure 4:
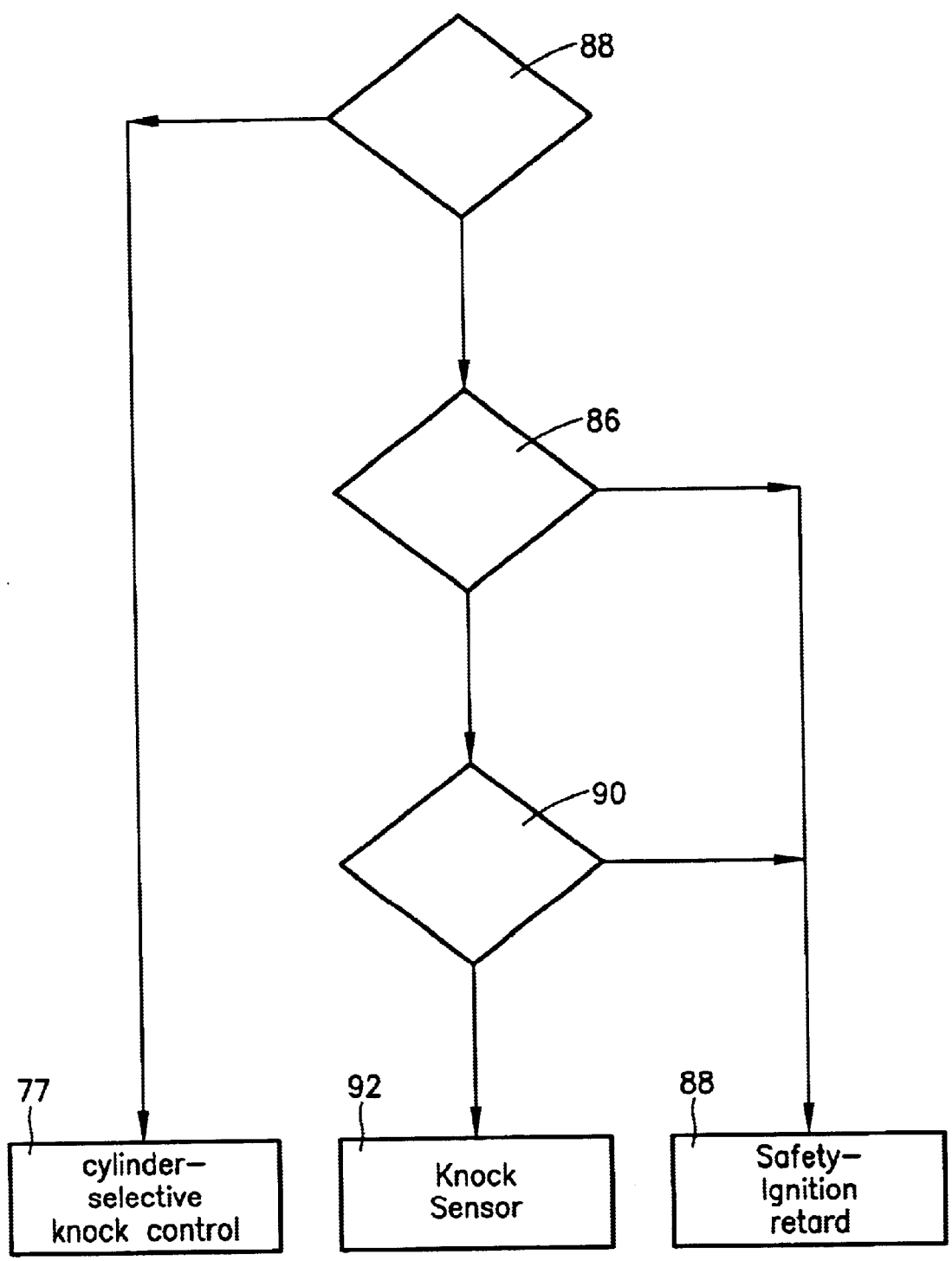
FIG. 4 shows a flowchart of a further embodiment, which illustrates the procedure of a multifunction control unit.

An additional exemplary embodiment of a method according to the present invention is represented by a flowchart in FIG. 4. Such a method can be used in a universal knock-control system that can be used in various types of internal combustion engines, which have differing numbers of cylinders and knock sensors. As is the case in the preceding example, it is once again assumed that the phase detector has failed. In an analogous manner, question 75 regarding the activation of dual ignition is posed. If question 75 is answered with no, then the method arrives at measure 77 again, the cylinder-selective knock control.

If question 75 is answered with yes, that is, if there is dual ignition, then further differentiation is performed, depending on the characteristics of the engine, in order to implement the correct, non-cylinder-selective measure.

At this point, the method initially arrives at question 86 regarding the existence of an odd number of cylinders. If the engine has an odd number of cylinders, i.e. if question 86 is answered with yes, then the method arrives at measure 88, the safety-ignition retard for all cylinders. In the case of an odd number of cylinders, dual ignition results in one instance of ignition actually taking place at the combustion-TDC of this cylinder, and the second ignition taking place at the overlap-TDC, no other cylinder being at combustion-TDC at this time. However, the knock control and, therefore, the adjustment of the measuring window, are carried out at the frequency of the single-spark ignition. Although the engine is running correctly, the missing phase information causes the synchronization between the ignition and the measuring window of the knock control to be unreliable, i.e. one cannot be sure if the measuring window is set after combustion-TDC. Therefore, safety-ignition retard is activated.

If question 86 is answered with no, that is, if there is an even number of cylinders, then, when a cylinder is currently at overlap-TDC, the second cylinder of the group is currently at combustion-TDC, because the ignition-advance angles of the cylinders of a cylinder group always differ by a 360 degree crank angle. In spite of there being dual ignition, the synchronization between the combustion and the measuring window is now correct, in the case of an even number of cylinders.

The method now arrives at the next question 90, if the system contains one or more knock sensors. If a plurality of knock sensors belong to the system, then measure 88, the safety-ignition retard for all cylinders, is once again reached. Noises from different knock sensors are received here.

Due to the missing phase information, it is not possible to assign the knock-control evaluation path to a knock sensor. Therefore, safety-ignition retard is activated for all cylinders.

If only one knock sensor is present in the system, then the method arrives at step 92, the knock detection using a single threshold value for all cylinders. As was previously established, the measuring window of the knock sensor can be correctly synchronized with respect to the ignition. The assignment of this measuring window to the single knock sensor is also ensured. Therefore, knock detection can still be carried out. But since the assignment to a specific cylinder of a cylinder group is not possible, one knock-detection threshold value is used for all of the cylinders. This one knock-detection threshold value takes the place of the cylinder-specific knock-detection threshold values, which are used in normal knock control. The knock-detection threshold value is generally the lowest cylinder-specific threshold value, since engine knock should be detected as reliably as possible.

Therefore, the cylinder-selective knock control is carried out in the method according to the exemplary embodiment of the present invention, without activating the dual ignition; and when the dual ignition is activated, either the measure of safety-ignition retard is taken, or a knock detection threshold is used for all cylinders, depending on the design of the engine and the knock control system. These two steps do not function in a cylinder-specific manner. While knock detection is no longer carried out during the measure, safety-ignition retard, and the ignition-advance angle is retarded in principle, another type of knock control can be carried out by way of the knock detection, using one threshold value for all cylinders, the knock control possibly producing a higher combustion efficiency. But if the engine type is such, that the knock detection measure cannot be attained using one threshold value for all cylinders, then the elimination of combustion knock in a reliable manner, using safety-ignition retard, should be preferred over attaining a high efficiency.

What is claimed is:

1. A method for controlling a knock of an internal combustion engine having a plurality of cylinders, comprising the steps of:

assigning each of the cylinders an ignition coil to generate a spark for a respective spark plug situated in each of the cylinders;

causing a speed sensor to generate a speed sensor signal indicating in which of the cylinders a piston is at top dead center;

causing a phase detector to generate a phase detector signal indicating which of the cylinders is in a power stroke;

individually generating for each of the cylinders a knock control signal in response to a presence of the speed sensor signal and the phase detector signal, wherein:

a dual ignition that generates a spark at each top dead center in each of the cylinders is capable of being activated;

in response to the phase detector failing while the dual ignition is activated, activating an emergency strategy for achieving a knock control, the emergency strategy including a non-cylinder-selective measure; and in response to the phase detector failing while the dual ignition is not activated, activating a normal, cylinder-selective knock control.

2. The method according to claim 1, wherein:

one of a permanently preset ignition-advance angle and a differential ignition-advance angle is used for the non-cylinder-selective measure to control the knock.

3. The method according to claim 1, wherein:

a uniform knock-detection threshold value is used for all of the cylinders, as a non-cylinder-selective, knock control measure, in order to detect the knock.

4. The method according to claim 2, further comprising the step of:

selecting, in a universal control unit, an appropriate, non-cylinder-specific measure as a function of parameters that correspond to a design of the internal combustion engine.

5. The method according to claim 4, wherein:

the parameters correspond to a number of the cylinders and a number of knock sensors.

6. A device for controlling a knock of an internal combustion engine having a plurality of cylinders, each one of the cylinders being assigned an ignition coil to generate a spark for a respective spark plug situated in the cylinders, comprising:

a speed sensor for detecting a top dead center of one of the cylinders, belonging to the internal combustion engine;

a phase detector for determining which of the cylinders is in a power stroke, belonging to the internal combustion engine;

a knock control system for generating a separate knock control signal for each of the cylinders, when the speed sensor and the phase detector are functioning correctly; and a device for producing a dual ignition that generates a spark at each top dead center in each of the cylinders when the phase detector fails, wherein:

in response to the phase detector failing while the device for producing the dual ignition is activated, the device for controlling the knock is operated, using an emergency knock-control strategy, the emergency knock-control strategy including a non-cylinder-selective measure, and in response to the phase detector failing while the device for producing the dual ignition is not activated, the device for controlling the knock generates a normal, cylinder-selective knock control signal.

7. The device according to claim 6, wherein:

one of a permanently preset ignition-advance angle and a differential ignition-advance angle is transmitted to an ignition control unit as the non-cylinder-selective measure to control the knock.

8. The device according to claim 6, wherein:

a uniform knock-detection threshold value is implemented as the non-cylinder-selective measure to control the knock for all of the cylinders.

9. The device according to claim 7, wherein:

an appropriate, non-cylinder-specific measure is selected as a function of parameters that correspond to a design of the internal combustion engine.

10. The device according to claim 9, wherein:

the parameters correspond to a number of the cylinders and a number of knock sensors.

* * * * *